Feb. 25, 1964
L. H. METZGER
3,122,030
METHOD OF ASSEMBLING A ROTARY SAW BLADE
WITH PERIPHERAL DIAMOND TEETH
Original Filed Aug. 23, 1960
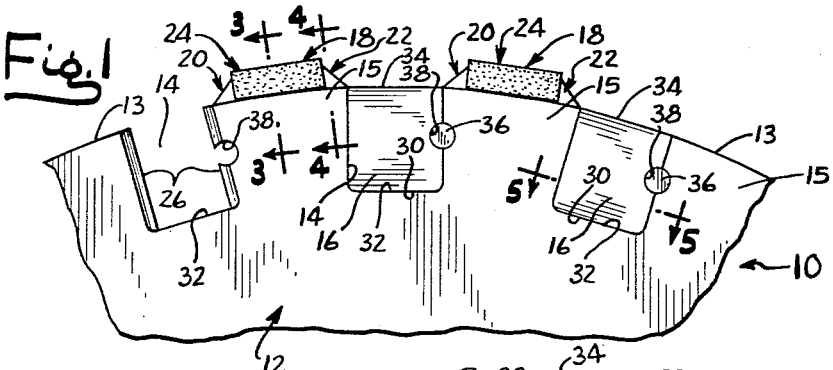
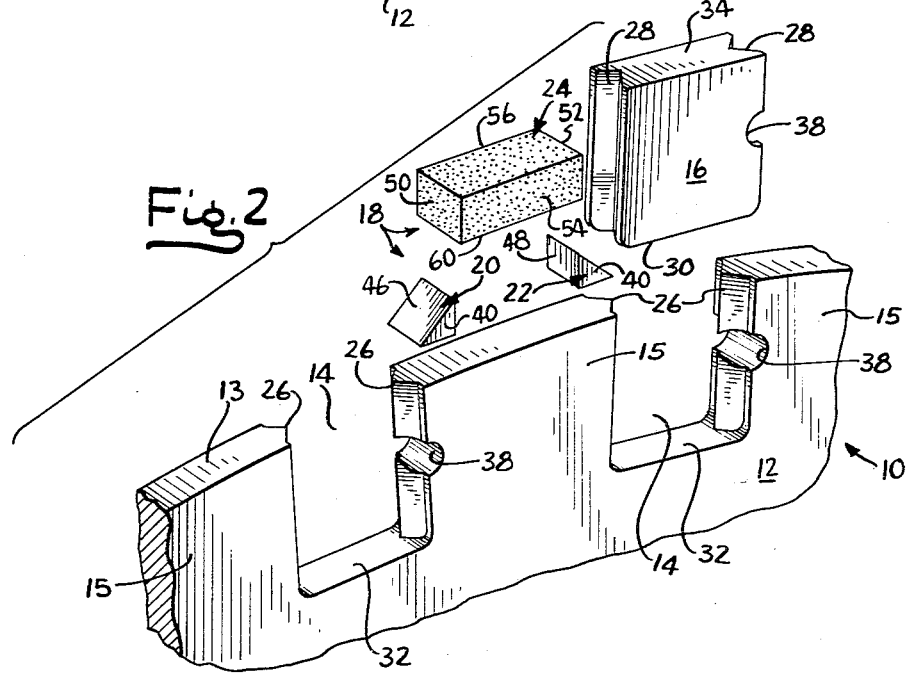
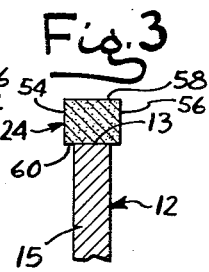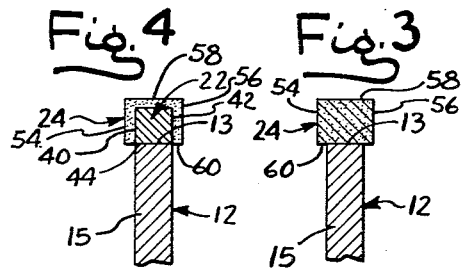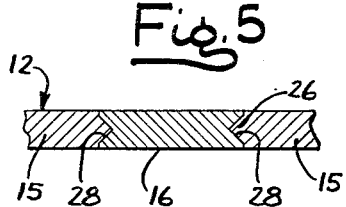
INVENTOR.
LEOPOLD H. METZGER
BY
ATTY.

United States Patent Office 3,122,030
Patented Feb. 25, 1964

3,122,030
METHOD OF ASSEMBLING A ROTARY SAW BLADE WITH PERIPHERAL DIAMOND TEETH
Leopold H. Metzger, Glencoe, Ill., assignor to Super-Cut, Inc., Chicago, Ill., a corporation of Illinois
Continuation of application Ser. No. 51,406, Aug. 23, 1960. This application Aug. 6, 1962, Ser. No. 215,496
3 Claims. (Cl. 76—112)

The present invention relates to rotary stone cutting saws of the type which is commonly employed for sawing limestone, marble, granite and the like, and has particular reference to a novel method of constructing such saws. The method of the present invention comprises forming in a flat, circular, metallic blade a series of equally spaced, circumferentially extending, peripheral notches which extend inwardly from the circular rim of the blade an appreciable distance so as to create in the rim a series of heat-dissipating voids with intermediate rim sections. A series of separately formed, elongated, block-like cutting parts in the form of matrices with diamond particles therein is then bonded directly to the rim of the blade by the application of heat, utilizing a suitable solder or other meltable bonding agent, one cutting part being thus applied to each intermediate part and bonded thereto throughout its length. This bonding operation is performed while the notches are unfilled or open so that each notch will present a relatively long, U-shaped, air-exposed edge for heat-dissipating purposes. After the bonding operation, the metal of the rim region cools rapidly due to the aforesaid air-exposed edges and, when the metal has sufficiently cooled, a series of flat, metal inserts which are shaped conformably to the notches, is driven into the notches to fill the voids created thereby and thus restore the continuity of the rim of the blade and place the rim under compression.

Heretofore, when the cutting parts were bonded directly to the unnotched and continuous rim of the blade, the thermal expansion of metal due to heat caused undesirable buckling of the rim and imparted thereto a wavy configuration. The present method obviates such buckling and results in a rim that is truly and continuously flat.

The present method is applicable to the manufacture of new saws or to the reconditioning of old saws which have been in service. In reconditioning an old saw by the present method, the inserts are removed from the notches, the old and worn-out cutting parts are then removed by the application of heat, and new cutting parts, utilizing a heat-bonding operation, are substituted after which the inserts are replaced.

The method of the present invention is illustrated in the accompanying single sheet of drawing forming a part of this specification.

In this drawing:

FIG. 1 is a fragmentary side elevational view of a rotary stone cutting saw which is constructed and assembled in accordance with the principles of the present invention;

FIG. 2 is an enlarged fragmentary perspective view of a portion of the saw of FIG. 1;

FIG. 3 is an enlarged sectional view taken on the line 3—3 of FIG. 1;

FIG. 4 is an enlarged sectional view taken on the line 4—4 of FIG. 1; and

FIG. 5 is an enlarged sectional view taken on the line 5—5 of FIG. 1.

Referring now to the drawing in detail, and in particular to FIGS. 1 and 2, a fragment of the peripheral region of a rotary saw for cutting stone and the like and assembled according to the method of the present invention, has been shown and is designated in its entirety by the reference numeral 10. The saw blade 12 is in the form of a relatively large, circular, flat-sided, disk-like member which is formed of steel or other suitable metal. The narrow circular rim 13 of the blade 12 is interrupted by a series of equally spaced, substantially rectangular notches 14 which extend radially inwardly of the blade periphery and define therebetween intervening rim sections 15. These notches are each filled with a steel insert 16, the nature and function of which will be set forth presently. Mounted on the rim 13 of the blade 12 and spanning the distances between adjacent pairs of notches 14 is a series of composite saw teeth 18, each tool consisting of a pair of spaced steel lugs 20 and 22, and an intervening operative cutting part 24, the nature and character of which will likewise be set forth hereafter. The composite teeth 18 project radially outwardly beyond the narrow circular rim 13 and are disposed in circumferentially spaced relationship so that they will successively engage the stone or other material undergoing sawing while at the same time a suitable combined liquid coolant and flushing media is applied to the work in the usual manner of operation.

The notches 14 are about as deep as they are wide and the radially extending side edges thereof are double bevelled in such a manner that they form ribs 26 of V-shape cross section. Each insert 16 is shaped conformably to, and fits within, its respective notch 14 in such a manner as completely to fill the same. Accordingly, the side edges of each insert 16 are formed with dovetail grooves 28 therealong. Such grooves serve to receive the ribs 26 with a tight friction fit. The inside edge 30 of each insert 16 meets the lower edge or bottom 32 of the associated notch 14 in coextensive edge-to-edge relationship. The outer edge 34 of each insert forms a smooth continuation of the interrupted blade rim 13. The various inserts 16 are pressed or forced into their respective notches 14 with a tight fit so that the entire rim is placed under compression and, therefore, is rigid. Each insert 16 is retained in position by a key-type rivet 36 which extends through a circular hole 38, one-half of the hole being formed in one side margin of the insert and the other half of the hole being formed in the adjacent side edge of the notch 14.

Each composite tooth 18 is comprised of but three parts, namely, the two steel lugs 20 and 22 and the intervening cutting part 24. The lugs 20 and 22 are each in the form of a wedge-shaped pentahedron having right triangular side faces 40 and 42, and three rectangular faces consisting of an inner face 44, a front face 46 and a rear face 48. The face 46 constitutes an hypotenuse surface. The cutting part 24 is in the form of a right angle hexahedron having end faces 50 and 52, side faces 54 and 56, an outside face 58, and an inside face 60. The cutting part 24 consists of a metallic matrix and crushed or fragmented diamonds distributed substantially uniformly throughout the entire matrix. The inner faces 44 of the lugs 20 and 22 and the inside face 60 of the cutting part 24 of each composite tooth 18 are curved or arcuate in conformity with the curvature of the rim 13 of the blade 12 in order that they fit flatly against the adjacent rim section 15.

The two lugs 20 and 22 are of a width either equal to or slightly greater than the thickness of the blade 12, while the cutting part 24 is somewhat of greater width than that of the lugs so that it projects laterally outwardly on opposite sides of the lugs, as best seen in FIG. 4. The inner faces 44 of the lugs are bonded directly to the rim 13 of the blade 12 by a bonding agent, such as silver solder or by a brazing operation, so that the rear faces 48 of the lugs 20 and 22 oppose each other and the transverse edges of the front faces 46 that are nearer the center of the blade are substantially coincident with the outer ends of the sides of the notches 14. The inside face 60 of each hexahedral cutting part 24 is similarly bonded to the rim 13 throughout its entire length so that it spans the distance between the opposed rear faces 48 of the adjacent lugs and the end faces 50 and 52 of each cutting part may be soldered or brazed to said opposed rear faces 48.

In the operation of the aforementioned stone cutting saw, the leading lugs 20, in addition to forming with the trailing lugs 22 and the rim 13 of the blade 12 vise-like pockets or seats for the cutting parts 24, have a twofold purpose. In the first place, they serve, in connectiton with a stone cutting operation, to absorb any shock which may be transmitted to the leading ends of the composite teeth 16 as a whole. Secondly, they form sludge-deflecting barriers for protecting the leading ends of the cutting parts 24 from the brading action of the sludge which is created by the cut stone particles and the liquid coolant and flushing material. By forming such barriers, the lugs 20 prevent undercutting or rapid wearing away of the leading end and side regions of the cutting parts. The trailing lugs 22 cooperate with the leading lugs 20 to afford the previously mentioned vise-like gripping action on the cutting parts 24 and also absorb any pressure which may be exerted thereon by said cutting parts.

According to the method of the present invention, the three parts 20, 22 and 24 of each composite tooth are separately and individually formed. Thereafter, these parts are bonded together in the final relationship which they will assume in the assembled saw, i.e., the rear faces 48 of the lugs 20 and 22 are bonded to the end faces 50 and 52, respectively, of the cutting part 24. The thus assembled composite saw tooth 18 may then be bonded as a unit in position on the rim 13 of the blade 12. Alternatively, the separately fashioned parts 20, 22 and 24 of each tooth may be individually bonded in position on the rim 13 in any desired order of installation and they also may be bonded to one another at any appropriate time during the installation.

When manufacturing a new saw, the circular disk-like blade blank is first notched to provide the series of circumferentially spaced notches 14 as previously described. The composite teeth 18 are then applied in position in any of the alternative methods heretofore described, after which the inserts 16 are inserted in the notches 14 and the secured therein by the rivets 36. The application of the teeth 18 directly to the rim 13 of the blade 12 prior to filling in the interrupted rim region of the blade with the inserts 16 constitutes one of the principal features of the present invention. The unfilled notches 14 constitute voids which afford the necessary degree of heat dissipation during the application of heat to the rim 13 in the installation of the composite teeth 18 so that there will be no buckling or warping of the rim region of the blade. The subsequent filling in of the notches 14 with the inserts 16 compresses the metal of the rim region of the blade and places the blade under the proper degree of compresison so that there will be no fluttering of the rim when the saw is put into service as previously described.

The invention is not to be limited to the precise heretofore described method steps inasmuch as these may be varied within certain limits without departing from the spirit of the invention. For example, in the manufacture of a new saw or in the reconditioning of a used saw, the order of installation of the various parts of the composite teeth 18 is not critical. All of the teeth 18 may be applied to the rim 13 before any of the inserts 16 are installed within the notches 14, or, alternatively, selected regions of the periphery of the blade 12 may be worked upon at appropriate times and in an appropriate sequential manner. Installation of any given insert 16 may be made at any time after the heat incident to the tooth bonding operation in the vicinity of the notch in which the insert is to be installed has been dissipated. Thus, tooth and insert installation may be conducted upon the circular blade sequentially in a clockwise or in a counterclockwise direction, or it may be effected at the will of the operator or operators in localized regions of the blade periphery without regard to sequence. The important thing is that a given composite tooth be applied directly to the rim of the blade prior to installation of the two inserts on opposite sides thereof, with time being allowed for cooling of the metal of the blade prior to installation of the inserts. Again, for example, it is contemplated that various composite teeth or assemblies 18 may be installed only on alternate rim sections 15 instead of on each and every rim section. Finally, it is not essential to the method that the step or steps of installing either or both steel lugs 20 and 22 be restored to. Some saws which are constructed according to the present method and do not employ these lugs have been found in practice to give satisfactory service.

This application is a continuation of United States patent application Serial No. 51,406, filed by me on August 23, 1960, now abandoned and entitled "Method of Assembling a Rotary Saw Blade with Peripheral Diamond Teeth."

Having thus described the invention what I claim as new and desire to secure by Letters Patent is:

1. The method of constructing and assembling a segmental saw for cutting stone and like material and which comprises providing a substantially flat, circular, metallic blade having a series of equally spaced, circumferentially extending, peripheral notches which extend inwardly from the circular rim of the blade an appreciable distance so as to create in the rim region of the blade a series of heat-dissipating voids with intervening rim sections, separately forming, elongated, block-like, cutting parts in the form of matrices with diamond particles therein, positioning the cutting parts on said rim sections and so that they extend lengthwise of the rim sections and have their inside faces in abutment with the peripheral portions of said rim sections, bonding the inside faces of the cutting parts throughout their entire length to said peripheral portions of the rim sections by way of the application of heat and while the notches are open or unfilled for heat-dissipating purposes, fashioning inserts substantially conformably in size and shape to the size and shape of said peripheral notches, and after bonding in place of the cutting parts and cooling of the metal of the blade forcibly driving said inserts into the notches in order to fill the notches and in addition to render the rim region of the blade continuous and to place the same under uniform compression throughout.

2. The method of constructing and assembling a segmental saw for cutting stone and like material and which comprises providing a substantially flat, circular, metallic blade having a series of equally spaced, circumferentially extending, peripheral notches which extend inwardly from the circular rim of the blade an appreciable distance so as to create in the rim region of the blade a series of heat-dissipating voids with intervening rim sections, separately forming, elongated, block-like, hexahedral cutting parts in the form of matrices with diamond particles therein, of less length than the circumferential extent of said rim sections, and having rectangular inside faces, rectangular outside faces, oppositely disposed rectangular side faces, and rectangular front and back faces, positioning the cutting parts on the medial regions of said rim sections and so that they extend lengthwise of the rim sections and have their ends spaced from the circumferentially spaced ends of the rim sections and the inside faces thereof in abutment with the peripheral portions of said rim sections, bonding the inside faces of the cutting parts throughout their entire length to said peripheral portions of the rim sections by way of the application of heat and while the notches are open or unfilled for heat-dissipating purposes, fashioning inserts substantially conformably in size and shape to the size and shape of said peripheral notches, and after bonding in place of the cutting parts and cooling of the metal of the blade driving said inserts into the notches in order to fill the notches and in addition to render the rim region of the blade continuous and to place the same under uniform compression throughout.

3. The method of constructing and assembling a segmental saw for cutting stone and like material and which comprises forming in a substantially flat, circular, disk-like, metallic blade a series of equally spaced, circumferentially extending peripheral notches which extend inwardly from the circular rim of the blade an appreciable distance so as to create in the rim region of the blade a series of heat-dissipating voids with intervening rim sections, separately forming a pair of identical metallic lugs each of which is in the form of a pentahedron having right triangular side faces, a rectangular inside face, a rectangular front face and a rectangular back face, separately forming a hexahedral cutting part in the form of a matrix with diamond particles therein and having a rectangular inside face, a rectangular outside face, opposite rectangular side faces and rectangular front and back faces respectively, bonding by the application of heat the inside faces of the two lugs to the periphery of one of the rim sections near the leading and trailing ends thereof respectively in spaced apart relationship, bonding by the application of heat the inside face of the cutting part to the periphery of said one rim section in between the spaced apart lugs and with the front end of the cutting part abutting the back face of the leading lug and the rear end of said cutting part abutting the back face of the trailing lug, separately fashioning a pair of inserts substantially conformable in shape to the shape of said peripheral notches, forcing said inserts into the notches on opposite sides respectively of said one rim section, and repeating the lug, cutting part and insert forming and mounting operations for each of said rim segments of the blade.

References Cited in the file of this patent
UNITED STATES PATENTS

| | | |
|---|---|---|
| 1,156,166 | Meyers | Oct. 12, 1915 |
| 2,589,357 | Fantozzi et al. | Mar. 18, 1952 |